(No Model.) 2 Sheets—Sheet 2.
G. GLASCOCK.
HAY PRESS.
No. 549,780. Patented Nov. 12, 1895.
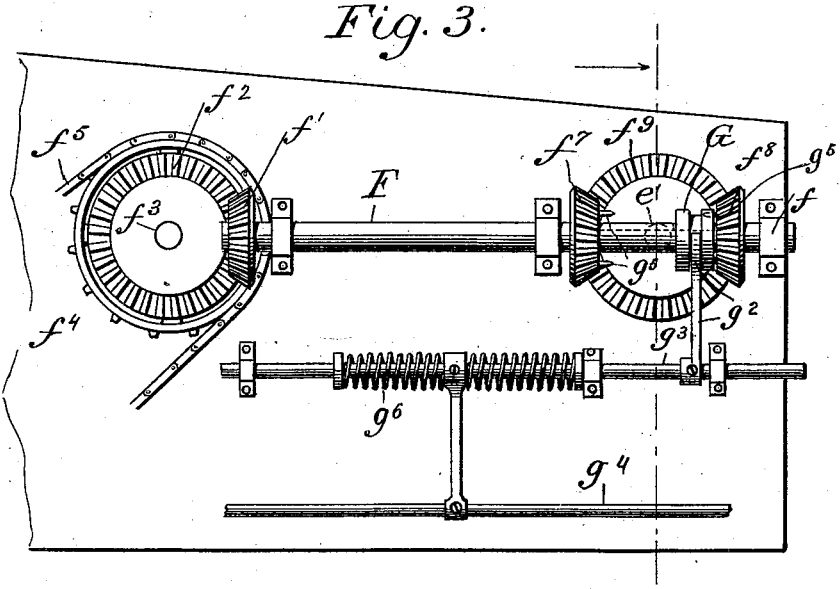
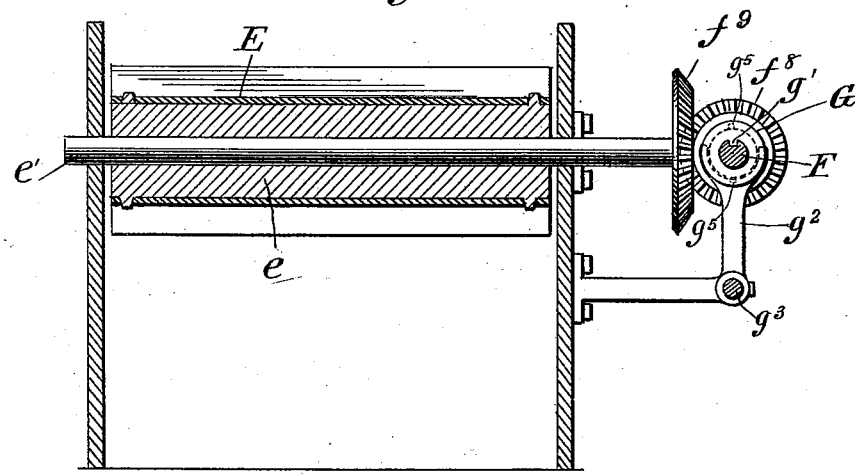
Witnesses:
Reese H. Voorhees
Robert B. Lines
Inventor.
George Glascock
By Oscar Foote
His Attorney

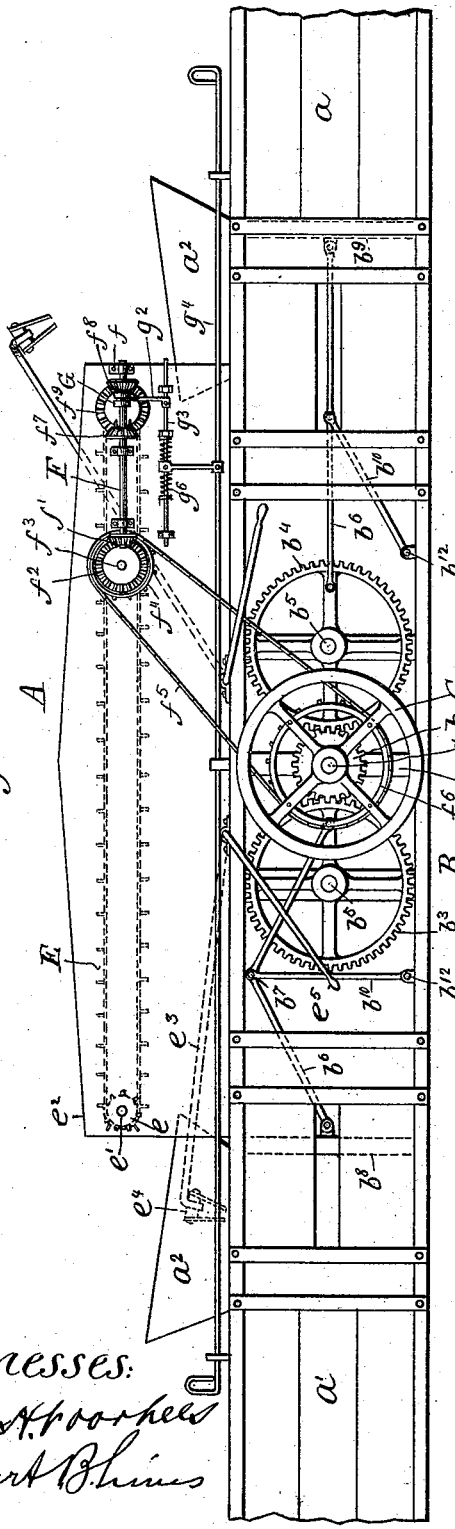

UNITED STATES PATENT OFFICE.

GEORGE GLASCOCK, OF VEEDERSBURG, INDIANA.

HAY-PRESS.

SPECIFICATION forming part of Letters Patent No. 549,780, dated November 12, 1895.

Application filed February 21, 1895. Serial No. 539,241. (No model.)

*To all whom it may concern:*

Be it known that I, GEORGE GLASCOCK, a citizen of the United States, residing at Veedersburg, in the county of Fountain and State of Indiana, have invented certain new and useful Improvements in Bale-Presses; and I do hereby declare the following to be a full, clear, and exact description of the invention, such as will enable others skilled in the art to which it appertains to make and use the same.

This invention contemplates certain new and useful improvements in bale-presses, and has for its object the production of a machine of this character by means of which the hay, straw, or other material can be quickly and efficiently packed into bales of uniform size and weight and discharged ready for shipping, storage, &c., in a minimum space of time.

The invention comprises the novel features of construction and also the detail combination and arrangement of parts, substantially as hereinafter fully set forth, and particularly pointed out in the claims.

In the accompanying drawings, Figure 1 is a view in side elevation of my improved bale-press. Fig. 2 is a plan view. Fig. 3 is a view of the conveyer gearing. Fig. 4 is a detail sectional view thereof.

Referring to the drawings, A designates the bale-press as an entirety, which is provided with two baling-chambers $a$ $a'$ at or near its opposite ends. Above each of these baling-chambers is a hopper $a^2$, which is designed to direct the hay, straw, or other material to be baled to the baling-chambers.

B represents the operating mechanism, which comprises a pinion $b$, keyed at about the center of shaft $b'$, journaled in uprights $b^2$ of the press-frame. Meshing with this pinion $b$ are two gear-wheels $b^3$ $b^4$, mounted on suitable shafts $b^5$, which are also journaled in said frame, and to these gear-wheels are secured arms or pitmen $b^6$, which are formed in sections and jointed at $b^7$, being connected at their other ends to the plungers $b^8$ $b^9$ of the baling-chambers $a$ $a'$, respectively. An arm or pitman $b^{10}$ is also secured to each of the pitmen $b^6$ at the joint $b^7$, the other end thereof being pivoted to the bottom of the bale-press at $b^{12}$. On one end of shaft $b'$ is a fly-wheel C, while the opposite end of said shaft is provided with a bevel gear-wheel $d$, which meshes with a similar gear-wheel $d'$ on the end of a shaft $d^2$, mounted in suitable bearings $d^3$, secured to the press-frame. A band-wheel D is on the other end of shaft $d^2$, and the same is connected by a belt or other suitable means to any preferred motive power. (Not shown.)

E is an endless conveyer which passes around suitable rollers $e$, mounted on shafts $e'$, supported by bearings $e^2$ on top of the press-frame. This conveyer is adapted to feed the hay, straw, or other material alternately to the hoppers $a^2$ of the two baling-chambers. As the material is fed into the hoppers, the same is pressed down therein by feeder-arms $e^3$, which are pivoted independent of each other on the press-frame adjacent to said hoppers, said arms being provided with presser-heads $e^4$. These feeder-arms are operated by means of suitable levers $e^5$ to which they are connected.

F is a shaft mounted in bearings $f$, secured to the conveyer-frame, said shaft having a beveled pinion $f'$ on one end thereof and which meshes with a similar pinion $f^2$ on a shaft $f^3$. A sprocket-wheel $f^4$ is also mounted on shaft $f^3$, and the same is connected by a sprocket-chain $f^5$ to a sprocket-wheel $f^6$ on shaft $b'$. On the other end of shaft F are loosely mounted two bevel pinions $f^7$ $f^8$, which mesh at opposite points with a bevel-gear $f^9$, rigidly mounted on one of the shafts $e'$ of the conveyer.

G is a clutch-block or pulley adapted to slide on shaft F between the pinions $f^7$ $f^8$, and the same is caused to revolve with said shaft by means of a key $g$, sliding in a groove $g'$ thereof. This clutch block or pulley has a central circumferential groove in which fits the end of a rod $g^2$, which latter has a lower rightangular portion $g^3$, which is made integral with an upwardly-projecting arm of a rod $g^4$, which is adapted to move said clutch-block or pulley between said beveled gears. Each of these beveled gear-wheels is provided with lugs or spurs $g^5$, projecting from its inner side, and said lugs or spurs are designed to engage or enter corresponding holes or recesses in the opposite sides of the clutch-block or pulley, whereby either of said pinions is caused to revolve with said clutch-block or pulley.

A coil-spring $g^6$ relieves the jar incident upon the shifting of the clutch.

In practice the hay or the like is fed by the conveyer to one of the hoppers and is then forced down into the same by the feeder-arm adjacent thereto, whereupon it is subjected to the action of the plunger of the bale-press coincident with said hopper. As soon as the baling operation is completed and while the bale is being tied, the conveyer is reversed by shifting the clutch G and the operation is repeated with the other press.

I claim as my invention—

1. In combination with a bale-press having two baling compartments, baling plungers in each of said compartments, gear wheels mounted adjacent said compartments, means for operating the same, and pitmen formed in sections and connecting said gear-wheels and plungers, of an endless conveyer mounted on said bale press, means for operating the same, a bevel pinion mounted on one of the shafts of said conveyer, two bevel pinions meshing with said former pinion loosely mounted on a revoluble shaft supported by bearings on said conveyer at right angles to said former shaft, and means for throwing said latter pinions alternately into operation, and independent feeder-arms pivoted to the press frame adjacent said baling chambers and provided with presser heads on their outer ends, substantially as set forth.

2. In combination with a bale-press having two baling compartments, baling plungers in each of said compartments, gear-wheels mounted adjacent said compartments, means for operating the same, and pitmen formed in sections and connecting said gear-wheels and plungers, of an endless conveyer mounted on said bale-press, means for operating the same, a bevel pinion mounted on one of the shafts of said conveyer, two bevel pinions meshing with said former pinion and loosely mounted on a revoluble shaft supported by bearings on said conveyer at right angles to said former shaft, a clutch pulley or block designed to alternately engage said latter pinions, a shifting rod for said clutch pulley or block, and independent feeder-arms pivoted to the press frame adjacent said baling chamber and provided with presser heads on their outer ends, substantially as set forth.

In testimony whereof I affix my signature in presence of two witnesses.

GEORGE GLASCOCK.

Witnesses:
ALVAH GLASCOCK,
E. M. FINE.